(12) United States Patent
Carbone et al.

(10) Patent No.: US 7,187,868 B2
(45) Date of Patent: Mar. 6, 2007

(54) WAVELENGTH DIVISION MULTIPLEXING OPTICAL TRANSMISSION SYSTEM USING A SPECTRAL INVERSION DEVICE

(75) Inventors: Fabrizio Carbone, Pasturana (IT); Luciano Socci, Milan (IT); Marco Romagnoli, Milan (IT)

(73) Assignee: Pirelli Cavi E Sistemi S.p.A., Milano (IT)

( * ) Notice: Subject to any disclaimer, the term of this patent is extended or adjusted under 35 U.S.C. 154(b) by 794 days.

(21) Appl. No.: 10/206,349

(22) Filed: Jul. 29, 2002

(65) Prior Publication Data
US 2003/0039006 A1    Feb. 27, 2003

Related U.S. Application Data

(60) Provisional application No. 60/309,480, filed on Aug. 3, 2001.

(30) Foreign Application Priority Data

Jul. 30, 2001    (EP) ................. 01118289

(51) Int. Cl.
*H04J 14/02* (2006.01)
*H04B 10/12* (2006.01)
*H04B 10/04* (2006.01)
*H04B 10/06* (2006.01)
*H04B 10/18* (2006.01)
*H04B 10/135* (2006.01)

(52) U.S. Cl. ............. 398/150; 398/81; 398/142; 398/148; 398/193; 398/208

(58) Field of Classification Search ............. 398/150
See application file for complete search history.

(56) References Cited

U.S. PATENT DOCUMENTS 5,365,362 A    11/1994    Gnauck et al.

(Continued)

FOREIGN PATENT DOCUMENTS

EP    0 862 078 A1    9/1998

(Continued)

OTHER PUBLICATIONS

Bergano, N.S. and C.R. Davidson. "Wavelength division multiplexing in long-haul transmission systems." Journal of Lightwave Technology, vol. 14, No. 6, Jun. 1996: 1299-1308.*

(Continued)

*Primary Examiner*—Kenneth Vanderpuye
*Assistant Examiner*—David S. Kim
(74) *Attorney, Agent, or Firm*—Finnegan, Henderson, Farabow, Garrett & Dunner, L.L.P.

(57) ABSTRACT

A WDM system includes a transmission station, a receiving station, a first optical path and a second optical path. The first optical path includes a first section and a second section, the second section being capable of compensating at least partially the dispersion accumulated by a series of optical channels along the first section. The series of channels includes at least a first plurality of channels having an average dispersion of the same sign in the first optical path. The system also includes at least a first conversion device, capable of inverting the spectrum and modifying the wavelength of at least the first plurality of channels, to produce a second plurality of channels having an average chromatic dispersion of the same sign in the second optical path.

25 Claims, 10 Drawing Sheets

U.S. PATENT DOCUMENTS

| | | | |
|---|---|---|---|
| 5,532,868 A | | 7/1996 | Gnauck et al. |
| 5,920,588 A | * | 7/1999 | Watanabe .................... 372/96 |
| 6,160,942 A | * | 12/2000 | Watanabe .................. 385/122 |
| 6,175,435 B1 | | 1/2001 | Watanabe |
| 6,304,348 B1 | * | 10/2001 | Watanabe ...................... 398/9 |
| 6,307,984 B1 | * | 10/2001 | Watanabe .................... 385/24 |
| 6,341,026 B1 | * | 1/2002 | Watanabe .................. 398/150 |
| 6,504,972 B2 | * | 1/2003 | Watanabe .................... 385/24 |
| 6,626,592 B2 | * | 9/2003 | Watanabe .................. 398/150 |
| 6,665,113 B2 | * | 12/2003 | Aso et al. .................... 359/326 |
| 6,771,853 B2 | * | 8/2004 | Watanabe .................... 385/24 |
| 6,870,974 B2 | * | 3/2005 | Watanabe .................... 385/11 |
| 2005/0220399 A1 | * | 10/2005 | Alberti et al. ................ 385/27 |
| 2006/0051039 A1 | * | 3/2006 | Wei ........................... 385/123 |

FOREIGN PATENT DOCUMENTS

| | | |
|---|---|---|
| JP | 2001203670 A * | 7/2001 |
| WO | WO00/14917 | 3/2000 |
| WO | WO00/38356 | 6/2000 |

OTHER PUBLICATIONS

Buxens, A. et al. "New Bi-Directional Mid Span Spectral Inversion Using Bi-Directional Four Wave Mixing In Semiconductor Optical Amplifiers." 24th European Conference on Optical Communication, 1998. Sep. 20-24, 1998: 97, 99.*

G.P. Agrawal, "Optical Phase Conjugation", *Fiber-Optic Communication Systems*, John Wiley & Sons, Inc., Second Edition, Chapter 9, pp. 448-459.

I. Brener et al., "Polarization-Insensitive Wavelength Converter Based on Cascaded Nonlinearities in $LiNbO_3$ Waveguides", Electronics Letters, vol. 36, No. 1, pp. 66-67, Jan. 2000.

A.H. Gnauck et al., "Transmission of Two Wavelength-Multiplexed 10GBIT Channels Over 560 KM of Dispersive Fibre", Electronics Letters, vol. 30, No. 9, pp. 727-728, Apr. 1994.

M.E. Marhic et al., Cancellation of Third-Order Nonlinear Effects in Amplified Fiber Links by Dispersion Compensation, Phase Conjugation, and Alternating Dispersion, Optics Letters, vol. 20, No. 8, pp. 863-865, Apr. 1995.

J. Yamawaku et al., "Timing Jitter Characteristics of the System Using OPC's and DSCF's", Optical Amplifiers and Long Haul Devices, Technology and Infrastructure, NOC '98, pp. 126-131, 1998.

J. Piña et al., "Periodically Conjugated Solitons in Dispersion-Managed Optical Fiber", Optics Communications, vol. 176, pp. 397-407, Apr. 2000.

C.R. Giles et al., "Polarization-Independent Phase Conjugation in a Reflective Optical Mixer", IEEE Photonics Technology Letters, vol. 7, No. 1, pp. 126-128, Jan. 1995.

S. Masataka, "Optical Fiber Transmission Path", Patent Abstracts of Japan of JP 09080491, published Mar. 28, 1997.

* cited by examiner

WAVELENGTH DIVISION MULTIPLEXING OPTICAL TRANSMISSION SYSTEM USING A SPECTRAL INVERSION DEVICE

CROSS REFERENCE TO RELATED APPLICATIONS

This application claims the benefit of U.S. Provisional Application Ser. No. 60/309,480, filed Aug. 3, 2001, the content of which is incorporated herein by reference, and claims the right to priority based on European Application No. 01118289.6, filed Jul. 30, 2001.

BACKGROUND OF THE INVENTION

1. Field of the Invention

The present invention relates to the compensation of chromatic dispersion in a wavelength division multiplexing (WDM) optical transmission system. In particular, the present invention relates to compensation of the dependence of the chromatic dispersion on wavelength by means of a spectral inversion device.

The following definitions are used in the remainder of the description:

Optical channel: modulated signal on an optical carrier having a given central frequency. The modulated signal has a frequency much lower than the central frequency of the optical carrier. For the purposes of the present description, reference will be made to the corresponding central wavelength of the channel, rather than to its central frequency. The optical channel has a given spectral width; in other words, it comprises different spectral components.

Chromatic dispersion (or, more simply, dispersion): defined as $D=d/d\lambda(1/v_g)$, where $v_g$ is the group velocity of a spectral component at a given frequency of a pulse which is propagated along an optical path. Because of the chromatic dispersion, the different spectral components of an optical pulse travel along a dispersive optical path at slightly different velocities from each other, causing a temporal widening or narrowing of the pulse.

Accumulated chromatic dispersion along an optical path: for an optical path consisting of a plurality of optical path segments, each of length $L_i$ and dispersion $D_i(\lambda)$, this is defined as $D_{acc}(\lambda)=\Sigma D_i(\lambda) \cdot L_i$. The summation is understood as an algebraic sum; in other words, the dispersions $D_1(\lambda)$ are taken with their sign. In practice, it corresponds to the chromatic dispersion measured at the output of the optical path for each wavelength.

Average chromatic dispersion of an optical path: for an optical path consisting of a plurality of optical path segments, each of length $L_1$ and dispersion $D_1(\lambda)$, this is defined as $D_{ave}(\lambda)=\Sigma D_1(\lambda) \cdot L_1/\Sigma L_1$. In other words, this is the accumulated chromatic dispersion on the optical path averaged over the whole length of the said optical path.

Spectral inversion: inversion of the spectral components of an optical channel with respect to its central frequency.

Optical phase conjugation: propagation of the phase conjugated of the electromagnetic field of an optical channel. The spectrum of an optical channel after a phase conjugation becomes a mirror image of the initial spectrum; in other words, the optical channel undergoes a spectral inversion.

The wavelength division multiplexing (WDM) technique can be used to transmit along a single optical fibre different channels modulated by signals at even high bit rates (for example, 10 Gbit/s or above), in such a way that the best use can be made of the optical transmission band provided by the optical fibre.

One of the problems of transmission along optical fibres is the compensation of chromatic dispersion, which causes a widening of a pulse transmitted along the optical fibre due to the different velocities of its spectral components. The result of the distortions introduced by chromatic dispersion is the degradation of the optical signal sent along the fibre, to levels which may be unacceptable.

2. Description of the Related Art

G. V. Agrawal, in Chapter 9 of his book "Fiber-optic Communication Systems", Wiley-Interscience Publication of John Wiley & Sons, Inc., reviews different methods of dispersion compensation. These include a widespread method by which the optical system is formed by alternating optical fibres having opposite signs of chromatic dispersion, in such a way that the average dispersion of the whole optical path is zero. For example, this can be achieved by alternating standard single mode fibres, having a chromatic dispersion in the region of 1.55 μm, in the range from approximately 16 ps/nm·km and 20 ps/nm·km, with short segments of dispersion compensating fibres (DCF), having a strongly negative dispersion. These DCF fibres are normally located next to the optical amplifiers present along the transmission line. This method enables the dispersion of a single channel to be compensated completely.

When the WDM method is used, the whole set of transmitted channels can occupy a band of 20–30 nm or more. Since the chromatic dispersion is dependent on the wavelength, with a practically linear relationship having a generally non-zero slope in the transmission window around 1.5 μm, different channels accumulate different dispersion levels, and it therefore becomes more difficult to compensate the dispersion over the whole signal band. This problem is particularly important in high bit rate systems (>10 Gbit/s), for which the dispersion compensation has to be carried out very accurately. The dependence of chromatic dispersion on the wavelength is sometimes referred to in the literature as "second order dispersion".

As far as broad-band dispersion compensation methods are concerned, in the case of a WDM system, G. V. Agrawal suggests, in Paragraph 9.8.2 of the cited book, the use of DCF fibres capable of compensating for dispersion throughout the signal band, such as DCF fibres with a negative dispersion slope, or the use of suitable filters, such as special optical fibre gratings (sampled fibre gratings).

According to the applicant, the use of DCF fibres which can simultaneously compensate the dispersion and the slope of the dispersion over the whole signal band is not an optimal solution, since these fibres, having very specific dispersion characteristics, are rather difficult to produce and therefore very expensive. Moreover, in previously installed systems this solution would require the replacement of all the DCF fibres of the system, with a considerable increase in cost.

The use of optical fibre gratings also has drawbacks, such as an imperfectly linear variation of dispersion with respect to wavelength, and a marked sensitivity to temperature variations, which makes it necessary to use suitable carefully designed packages in which the operating temperature is controlled.

As explained in Paragraph 9.7 of the previously cited book by G. V. Agrawal, another technique for compensating for chromatic dispersion introduced by an optical path is optical phase conjugation. This technique consists in propagating, from approximately halfway along the optical path, the phase conjugate of the electromagnetic field of an optical signal propagated along the path. From the mathematical point of view, this is equivalent to propagating the optical signal along a portion of optical path having a chromatic dispersion equal and opposite to that of the portion preceding the phase conjugator. Therefore, from the mathematical point of view, except for the phase inversion introduced by the phase conjugator, the "original" optical field (in other words that introduced at the input of the optical path) is completely restored, together with the original shape of the pulse. Since the spectrum of the signal is inverted after the phase conjugator, the phase conjugation method of dispersion compensation is also known as spectral inversion ("midspan spectral inversion", or MSSI).

The practical implementation of the phase conjugation technique requires the use of a non-linear optical element to generate the phase conjugated signal. A commonly used method requires the use of four-wave mixing (FWM) in a non-linear medium. For example, the non-linear medium can be an optical fibre or a semiconductor amplifier. Further details can be found in the book by Agrawal cited above. In another example, I. Brener, M. H. Chou, E. Chaban, K. R. Parameswaran, M. M. Fejer, S. Kosinski and D. L. Pruitt, in "Polarization-insensitive wavelength converter based on cascaded nonlinearities in LiNbO$_3$ waveguides", *Electronics Letters*, vol. 36, no. 1, pp. 66–7 (2000), describe a wavelength conversion device based on periodically polarized lithium niobate integrated waveguides, which, according to these authors, can also be used as a spectral inverter.

The MSSI dispersion compensation technique has also been proposed and experimentally implemented for wavelength division multiplexing systems. For example, A. H. Gnauck, R. M. Jopson, P. P. Tannone and R. M. Derosier, "Transmission of two-wavelength-multiplexed 10 Gbit/s channels over 560 km of dispersive fibre", *Electronics Letters*, vol. 30, no. 9, pp. 727–8 (1994), describe an experiment in which a phase conjugation technique is used to compensate the dispersion of two 10 Gbit/s channels, with wavelengths in the region of 1.5 μm, in 560 km of optical fibre having $\lambda_0$ at 1.3 μm. The wavelengths of the two transmitted channels were 1542.2 nm and 1543.1 nm. The accumulated chromatic dispersion along the 560 km of the system was 9600 ps/nm. The phase conjugator was based on non-degenerate four-photon mixing (FPM) with pumping radiation polarized orthogonally with each other in a 7.8 km long dispersion shifted optical fibre (DSF). Two pumping radiations, at 1547.2 nm and 1548.2 nm respectively, were combined together by means of a polarization beam splitter (PBS) and sent to the DSF fibre. The resulting conjugate signals had wavelengths of 1553.0 nm and 1553.9 nm respectively.

Another example of using a phase conjugator with a plurality of channels in a WDM system is described in patent application WO 00/14917, in the name of Nokia Networks. According to the description, a first set of optical signals having different wavelengths from each other is transmitted from a first end of an optical fibre, and a second set of optical signals having different wavelengths from each other is transmitted from a second end of the same optical fibre. To optimize the costs of the optical network, the same wavelengths are used in the first and second sets, and a bidirectional phase conjugator is used in the optical fibre. The bidirectional phase conjugator changes each incoming wavelength into an outgoing wavelength by folding the incoming wavelength with respect to a folding wavelength. The signals received from both ends of the optical fibre have wavelengths identical to the wavelengths leaving the phase conjugator. In a preferred embodiment, the phase conjugator is located essentially in the centre of the optical path, in such a way as to compensate the chromatic dispersion. In another preferred embodiment, the terminal equipment uses a bidirectional optical amplifier having a non-uniform gain spectrum, and the channels are selected in such a way that the received wavelengths fall within the peak portion of the useful range of the gain curve and each of the transmitted wavelengths falls within the portion in which the gain curve is essentially flat.

The phase conjugation technique has also been studied for compensating third-order non-linear effects, such as FWM, self-phase modulation (SPM) and cross-phase modulation (XPM). For example, M. E. Marhic, N. Kagi, T.-K. Chang and L. G. Kazovsky, "Cancellation of third-order nonlinear effects in amplified fiber links by dispersion compensation, phase conjugation, and alternating dispersion", *Optics Letters*, vol. 20, no. 8, pp. 863–5 (1995), show that it is theoretically possible to cancel the third-order non-linear effects in optical fibre paths. The necessary conditions are present in paths with two segments, with dispersion compensation, phase conjugation and amplification between the two segments, and also opposite chromatic dispersion coefficients in the two segments.

Paragraph 9.7.2 of the previously cited book by Agrawal also shows that chromatic dispersion and SPM can theoretically be compensated simultaneously by phase conjugation.

U.S. Pat. No. 6,175,435, held by Fujitsu Limited, describes an optical communication system, of the WDM type for example, which uses phase conjugation to compensate chromatic dispersion and the optical Kerr effect. A phase conjugator is placed between a transmission line I and a transmission line II. The desired compensation can be obtained if the value of the dispersion and the product of the non-linear refractive index and light intensity in each subsection of the transmission lines I and II is specified in such a way as to be inversely proportional to the length of the section, and also if the corresponding ratio is equalized. In one embodiment, a plurality of additional optical fibres is used to provide additional compensation in case of WDM transmission. The WDM channels transmitted through an optical fibre SMF1 are converted by the phase conjugator and transmitted through an optical fibre SMF2 to be received by corresponding receivers. The signs of the dispersion upstream and downstream of the phase conjugator are equal. A frequency selection is carried out for each channel after the outgoing signal from the optical fibre SMF2 has been divided, and then a further compensation is carried out by using additional optical fibres, which are matched to the amount of residual compensation for the individual channels.

The use of compensators of chromatic dispersion or of the slope of the chromatic dispersion in conjunction with phase conjugators is described in other documents. For example, U.S. Pat. No. 5,532,868, held by AT&T Corp., describes an apparatus and a method for compensating the chromatic dispersion introduced by the signal conversion of an optical signal. In a described apparatus, a non-linear conversion means is placed within the path of an optical signal. The non-linear conversion means receives the optical signal and generates a converted optical signal. At least one dispersion compensator is placed within the signal path to provide a quantity of chromatic dispersion sufficient to counterbalance a portion of the chromatic dispersion introduced into the converted signal by the non-linear conversion means.

J. Yamawaku, M. Hanawa and M. Takahara, in "Timing jitter characteristics of the system using OPC's and DSCF's", *Technology and Infrastructure. NOC '98*, pp. 126–31 (1998), propose a system configuration comprising two phase conjugators placed at L/4 and 3/4L (where L is the total length of the system), with a spacing of 60 km between the amplifiers. Each span between the amplifiers consists of a dispersion shifted fibre (DSF) with a length of 50 km and a dispersion slope compensation fibre (DSCF) with a length of 10 km. As shown in FIG. 2 of the article, the DSF and DSCF fibres have the same dispersion value at the signal wavelength. The phase conjugators compensate the chromatic dispersion and the Kerr effect, while the DSCF fibre compensates the third-order dispersion effects. The dispersion slope of the DSCF fibre is five times greater (in absolute value) than the slope of the dispersion of the DSF fibre. According to the authors, the use of a plurality of phase conjugators in the said system enables the spacing between the amplifiers to be increased without degradation of the transmission characteristics.

J. Piña, B. Abueva and C. Goedde, in "Periodically conjugated solitons in dispersion-managed optical fiber", *Optics Communications*, pp. 397–407 (2000), present an analysis of long-distance propagation through short optical solitons ($\tau \approx 0.5$ ps) in a non-linear optical fibre which incorporates the effects of periodic phase conjugation and dispersion management. In the treatment, carried out for a single channel, the effects of the frequency conversion introduced by the phase conjugators are disregarded.

To enable the chromatic dispersion to be exactly compensated by the MSSI technique, the fact that the chromatic dispersion undergone by the conjugated signal may be different from the dispersion undergone by the original signal has to be taken into account. This is because the wavelength of the phase conjugated signal is generally different in practice from the wavelength of the original signal, and, as noted above, the chromatic dispersion depends on the wavelength. For a single channel, perfect compensation of the chromatic dispersion by the MSSI method is possible if the phase conjugator is slightly shifted with respect to the exact centre of the optical path, in such a way as to allow for the different chromatic dispersion characteristics of the optical path downstream of the phase conjugator. This method is not adequate for a case where a plurality of channels is transmitted at different wavelengths.

U.S. Pat. No. 5,365,362, held by AT&T Bell Laboratories, describes an apparatus and a method for achieving bit rate-distance products of the order of 200 Tbit/s·km in non-soliton optical communication by using optical phase conjugation. The method and apparatus utilize phase conjugation in combination with an adjustment of the number of line amplifiers, their spacing, and/or their output power in order to compensate for the interaction between the first-order dispersion and the non-linearity dispersion effects in an optical fibre span. A description is also given of additional techniques for adjusting the system parameters, such as the dispersion-length products of the first and second portions of the fibre span, in order to compensate for changes in the first-order dispersion resulting from a non-zero second-order dispersion. As explained in U.S. Pat. No. 5,365,362, the proposed method and apparatus are also applicable to multi-channel systems, by using a multi-channel optical phase conjugator, as shown in FIG. 5 of the patent for example. The multi-channel phase conjugator comprises a first channel router, which receives the multi-channel optical signal on a common path and separates it into the different channels according to the wavelength or frequency of each channel. The multi-channel phase conjugator also includes a plurality of single-channel phase conjugators, each of which phase conjugates one of the channels by "four-photon mixing". After the mixing has produced the phase conjugated output signal for a given input channel, the individual phase conjugated channels are recombined in a second channel router, in such a way that the desired phase conjugate of the whole multi-channel signal is obtained on the common output path. According to the inventors of U.S. Pat. No. 5,365,362, the frequency shift of each channel resulting from the phase conjugation should be such that optimal compensation of the second-order dispersion effects is possible for each channel. According to the description, one technique consists in carrying out the phase conjugation process in such a way that each phase conjugated channel undergoes the same minimum amount of dispersion. This can be achieved by phase conjugating each channel in such a way that its frequency after the phase conjugation is that of the adjacent channel to it before the phase conjugation.

According to the applicant, this technique for compensating the second-order dispersion effects is rather complicated and costly, since a multi-channel phase conjugator consisting of as many phase conjugators as there are channels in the system is a very complex device, particularly for systems with many channels. It is also disadvantageous when the number of channels in a system is increased, as a result of an increase in the required transmission capacity: in this case, a multi-channel conjugator of this type would have to be redesigned and/or replaced to allow for the introduction of the new channels.

The applicant has verified that, in a high transmission rate WDM system, it is possible that dispersion compensation using optical fibres with alternating dispersion, with a non-zero slope of the average dispersion with respect to the wavelength, will not permit satisfactory reception of a large part of the WDM signal, even if it is carried out with additional post-compensation optical fibres dedicated to each channel before the receiver. Because of the non-zero slope of the average dispersion, the channels with a higher average dispersion accumulate a large amount of dispersion. According to the applicant, these channels are more sensitive to distortion due to non-linear effects (such as XPM and SPM) which occur in the course of transmission along the optical line, so that a linear compensation of the dispersion before the receiver is no longer sufficient to recover an acceptable shape of the pulses. These non-linear effects can arise, in particular, for transmission at a high bit rate (>10 Gbit/s), as a result of the shorter duration of the transmitted pulses and the consequent higher peak power of the pulses.

The applicant has tackled the problem of compensating the chromatic dispersion over a broad band in a WDM system with a high transmission rate (>10 Gbit/s) in such a way as to obtain an acceptable level of reception for the channels included in this band, without the need to use optical fibres with special characteristics (such as inverted slope fibres) or fibre gratings with special characteristics.

SUMMARY OF THE INVENTION

The applicant has found that this problem can be solved by using the spectral inversion technique in an optical transmission system with dispersion of alternate sign. The applicant has verified that, by using a spectrum inverter together with optical fibres with alternating dispersion, it is possible to obtain a very wide wavelength band for transmission at high bit rates, for example at 40 Gbit/s, with very low reception errors for the transmitted channels. The use of a spectrum inverter is advantageous, in particular, for WDM systems with alternating dispersion which are already installed, since it can easily be implemented in the system.

In a first aspect thereof, the invention relates to a method of optical transmission in a WDM system comprising an optical link, the said optical link comprising at least a first and a second optical path, the said first optical path comprising at least a first section and a second section, the said method comprising the steps of:

transmitting along the said first section of optical path a series of optical channels comprising at least a first plurality of optical channels having, in the said first optical path, a first plurality of average dispersion values having the same sign with each other, compensating, at least partially, the dispersion accumulated by the said first plurality of channels in the said first section along the said second section of optical path, at the end of the said first optical path, inverting the spectrum and modifying the wavelength of the said first plurality of optical channels in such a way as to obtain a second plurality of optical channels, having, in the said second optical path, a corresponding second plurality of values of average dispersion, having the same sign as the values of average dispersion of the said first plurality, transmitting the second plurality of optical channels along the said second optical path.

Preferably, the step of compensating at least partially can comprise compensating the dispersion accumulated by the channels of the said first plurality at a level in the range from 60% to 100%.

Alternatively, the step of compensating at least partially can comprise compensating in excess the dispersion accumulated by the channels of the said first plurality at a level in the range from 100% to 140%.

In a preferred embodiment, the first section comprises a first optical fibre and the second section comprises a second optical fibre. The first and second optical fibres have chromatic dispersions of opposite sign in a transmission band comprising at least the said first plurality of channels.

The steps of spectrum inversion and modification of the wavelength of the channels of the said first plurality can be carried out by means of at least a first phase conjugation device.

In this embodiment, the modification of the wavelength comprises the folding of the wavelength value of the optical channels of the said first plurality around the wavelength value of a folding radiation in the phase conjugation device.

The folding radiation can be in the range from the minimum to the maximum wavelength of the channels of the said first plurality, or can be less than the minimum wavelength of the channels of the said first plurality, or can be greater than the maximum wavelength of the channels of the said first plurality.

The series of optical channels can also comprise at least a third plurality of optical channels having, in the said first optical path, a corresponding third plurality of values of average dispersion having the opposite sign to the values of average dispersion of the said first plurality. In this case, the method according to the invention can additionally comprise, before the said step of inverting the spectrum, the step of separating the channels of the said first plurality from the channels of the said third plurality, in a third and a fourth optical path respectively.

In this embodiment, the first conversion device can be comprised in the third optical path and the fourth optical path can comprise a second conversion device. In this case, the method according to the invention can additionally comprise the steps of:

inverting the spectrum and modifying the wavelength of the said third plurality of channels in the second conversion device in such a way as to produce a fourth plurality of channels, having a corresponding fourth plurality of values of average dispersion which, in the said second optical path, have the same sign as the values of average dispersion of the said third plurality, combining the said second and the said fourth plurality of channels in the said second optical path, transmitting the said fourth plurality of channels along the said second optical path.

In a preferred embodiment, the second optical path comprises at least a third section and a fourth section, and the step of transmitting at least the said second plurality of channels additionally comprises the steps of:

transmitting along the said third section of optical path at least the said second plurality of channels, compensating at least partially the dispersion accumulated by the said second plurality of channels in the said third section along the said fourth section of optical path.

In a second aspect thereof, the invention relates to a WDM system comprising:

a transmission station capable of providing a series of optical channels;

a receiving station;

a first optical path, connected at a first end to the said transmission station, comprising a first section and a second section, the said second section being capable of compensating at least partially a dispersion accumulated by the said series of optical channels along the said first section, the said series of channels comprising at least a first plurality of channels having a corresponding first plurality of values of average dispersion in the said first optical path, having the same sign with each other;

a second optical path, connected at a first end to the said receiving station;

at least a first conversion device, connected between the said first and the said second optical path, and capable of inverting the spectrum and modifyng the wavelength of at least the said first plurality of channels, in such a way as to produce a second plurality of channels having, in the said second optical path, a corresponding plurality of values of average chromatic dispersion, having the same sign as the values of the said first plurality.

In a preferred embodiment, the first section can comprise at least a first optical fibre and the second section can comprise at least a second optical fibre having a dispersion of opposite sign to the said first optical fibre in a wavelength band comprising at least the said series of channels.

Even more preferably, the said first and the said second optical fibre have a dispersion, in absolute value, greater than or equal to 1 ps/(nm km) at 1550 nm.

The conversion device can comprise a phase conjugation device.

Preferably, the phase conjugation device is a polarization-independent device.

This phase conjugation device folds the wavelength of the said first plurality of channels about a folding wavelength.

The said folding wavelength can be in the range from the minimum to the maximum wavelength of the channels of the said first plurality, or can be less than the minimum wavelength of the channels of the said first plurality, or can be greater than the maximum wavelength of the channels of the said first plurality.

The said series of optical channels can additionally comprise at least a third plurality of channels, having a corresponding third plurality of values of average chromatic dispersion having a sign opposite to that of the values of the said first plurality of channels in the said first optical path. In this case, the system can comprise at least one demultiplexing device, located upstream of the said conversion device and capable of separating the channels of the said first plurality from the channels of the said third plurality, in a third and a fourth optical path respectively.

In this embodiment, the said third optical path can comprise the said first conversion device;

the said fourth optical path can comprise a second conversion device capable of inverting the spectrum and modifying the wavelength of the said third plurality of channels in such a way as to produce a fourth plurality of channels, having, in the said second optical path, a corresponding plurality of values of average chromatic dispersion, having the same sign as the values of the said third plurality;

the system can comprise at least one multiplexing device, connected to the said third and the said fourth optical path downstream of the said conversion devices, and capable of combining the said second and the said fourth plurality of channels into the said second optical path.

Preferably, the second optical path comprises a third section and a fourth section, the said fourth section being capable of compensating at least partially a dispersion accumulated by the said series of optical channels along the said third section.

Typically, the system according to the invention comprises at least one line amplifier in the said first or in the said second optical path.

Advantageously, the said conversion device is located close to a line amplifier.

Preferably, the said transmission station comprises a section for pre-compensation of the chromatic dispersion of the said series of optical channels.

Preferably, the said receiving station comprises a section for post-compensation of the chromatic dispersion of the said series of optical channels.

Preferably, the said series of optical channels is modulated at a bit rate of more than 10 Gbit/s.

BRIEF DESCRIPTION OF THE DRAWINGS

Further characteristics and advantages of the present invention will be made clearer by the following detailed description of some preferred embodiments, provided below with reference to the attached drawings, in which.

DETAILED DESCRIPTION OF THE INVENTION

Figure 1:
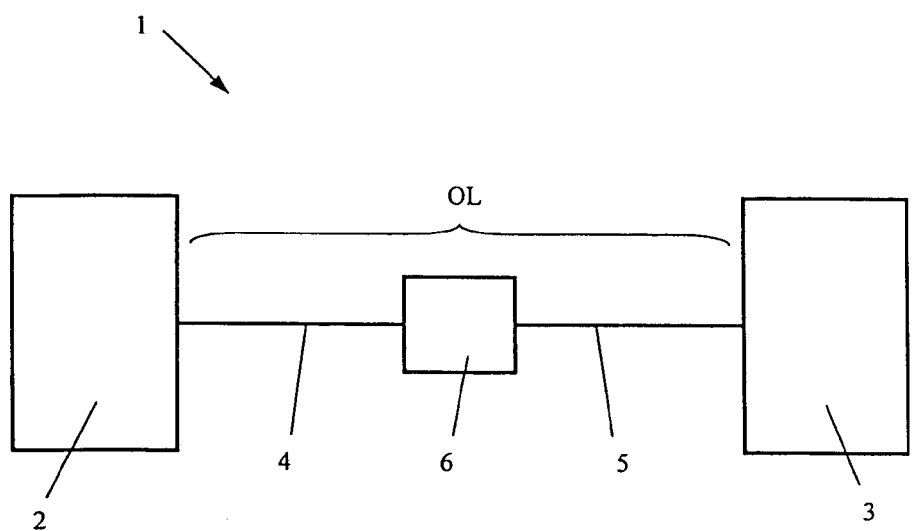
FIG. 1 shows schematically a first embodiment of a WDM system according to the invention.

With reference to FIG. 1, a WDM system 1 according to the invention comprises a transmission station 2 and a receiving station 3, interconnected by an optical link OL. This optical link OL comprises a first optical path 4, a second optical path 5 and at least one conversion device 6, located between the first and the second optical path 4, 5.

The transmission station 2 typically comprises a plurality of transmitters, capable of providing a plurality of optical channels having different wavelengths from each other, and a multiplexing device capable of combining the different channels into the first optical path 4. Here and in the remainder of the description, the term "plurality" denotes "at least two". Each transmitter typically comprises a laser source which emits a continuous optical signal (cw) acting as an optical carrier and an external modulator capable of superimposing the signal on the optical carrier. Alternatively, the emission of the laser source can be directly modulated by this signal. For a WDM transmission, the transmission station 2 comprises at least two laser sources. Typically, the wavelength band containing the transmitted channels is located around 1.55 μm, in what is known as the "third window" of telecommunications, between approximately 1520 and 1570 nm. Studies are already being conducted on systems which enable this band to be extended even up to wavelengths of approximately 1600 nm or above. The signals superimposed on the optical carriers are at high bit rates greater than 10 Gbit/s, preferably greater than or equal to 20 Gbit/s, and even more preferably greater than or equal to 40 Gbit/s. Preferably, these signals are of the RZ (return-to-zero) type.

The multiplexing device can comprise a single WDM optical multiplexer, capable of combining all the channels into the first optical path 4, or combinations of optical multiplexers, organized in such a way as to combine together subsets of channels into intermediate optical paths initially, and then to combine these subsets of channels into the single optical path 4. Possible examples of optical multiplexers usable in the system according to the invention are conventional passive couplers of the fused fibre or planar optics types.

The transmission station 2 can also comprise an optical transmission preamplifier, located downstream of the multiplexing device, which can provide all the channels with a sufficient power level to counter the attenuation introduced by at least a first part of the optical path 4. This optical transmission preamplifier can be, for example, an erbium-doped optical fibre amplifier.

The transmission station 2 can also comprise a section for pre-compensation of the chromatic dispersion upstream or downstream of the multiplexing device, comprising for example one or more pieces of optical fibre. This pre-compensation section introduces a predetermined quantity of dispersion into the pulses sent in the first optical path 4, in such a way as to widen them suitably. This method is used to keep the peak power of the pulses sufficiently low, in order to decrease the occurrence of non-linear effects in the optical transmission.

The receiving station 3 comprises a demultiplexing device, capable of separating the WDM optical signal coming from the second optical path 5 into a plurality of channels, and a plurality of optical receivers typically corresponding to the channels separated by the demultiplexer device, these receivers being capable of separating the modulated signal from the optical carrier for each optical channel.

The demultiplexing device can comprise a single WDM optical demultiplexer, capable of separating all the channels coming from the second optical path 5 into a corresponding number of optical paths, or combinations of optical demultiplexers, organized in such a way as to separate subsets of channels into intermediate optical paths initially, and then to separate the single channels from these intermediate optical paths. Possible examples of optical demultiplexers usable in the system according to the invention are conventional passive couplers of the fused fibre or planar optics types, followed by suitable filters tuned to the different channels, or WDM demultiplexers based on interference phenomena and capable of directly separating the different channels, such as AWGs (arrayed waveguide gratings).

The optical receivers comprise photodetectors capable of converting each optical channel into an electrical signal and of extracting from this electrical signal the modulated signal from the high-frequency carrier corresponding to the optical carrier. Typically, these photodetectors can be conventional photodiodes.

The receiving station 3 can also comprise an optical receiving preamplifier, located upstream of the demultiplexing device, for example one which can decrease the power differences between the different channels introduced by the transmission line. This optical receiving preamplifier can be, for example, an erbium-doped optical fibre amplifier.

The receiving station 3 can additionally comprise a post-compensation section upstream or downstream of the demultiplexing device, comprising for example one or more pieces of optical fibre. This post-compensation section provides a quantity of dispersion to the pulses arriving from the second optical path 5, in such a way as to restrict them suitably to a width compatible with the bit rate of the system. In the post-compensation section, each of the different pieces of post-compensation optical fibre can be dedicated to the compensation of a single channel or of a plurality of channels.

Figure 2:
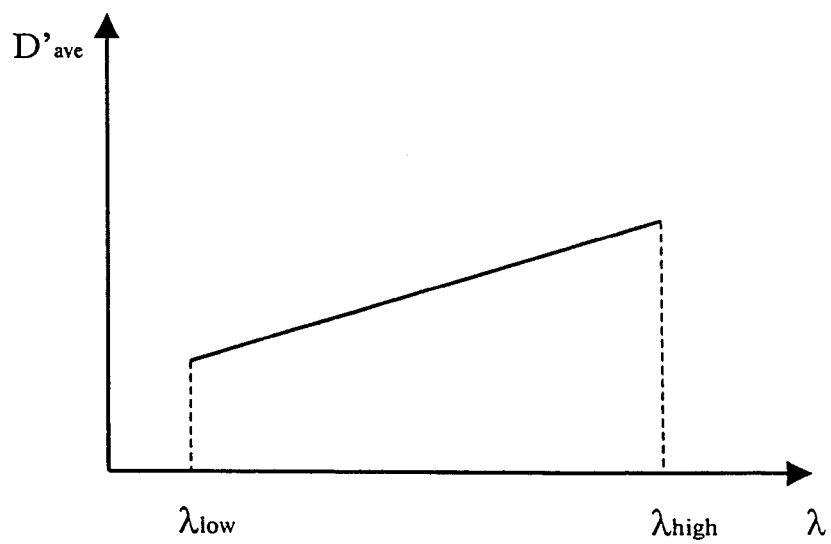
FIG. 2 shows schematically the behaviour of the average dispersion of an optical path in a predetermined wavelength band.

The first optical path 4, located between the transmission station 2 and the conversion device 6, comprises at least a first section and a second section of optical path which are optically interconnected. The first section of optical path comprises at least a first single-mode optical fibre. The second section of optical path can comprise at least a second single-mode optical fibre and has an average dispersion of opposite sign to that of the first optical fibre in the transmission band. The second section of optical path will also be referred to in the following as the compensation section. The two sections of optical path are disposed according to a given map of chromatic dispersion. Typically, in a wavelength band around 1550 nm, the first optical path 4 has an average chromatic dispersion $D'_{ave}$ which is monotonically dependent on the wavelength, with a given non-zero slope. FIG. 2 shows an essentially rectilinear variation of $D'_{ave}$ as a function of wavelength, in a range from a wavelength $\lambda_{low}$ to a wavelength $\lambda_{high}$, which in this diagram represent the extremes of the wavelength band containing the channels transmitted by the transmission station 2. For example, $\lambda_{low}$ and $\lambda_{high}$ can be 1520 nm and 1570 nm respectively. Typically, as shown in FIG. 2, the slope of the curve $D'_{ave}(\lambda)$ is positive.

Figure 3:
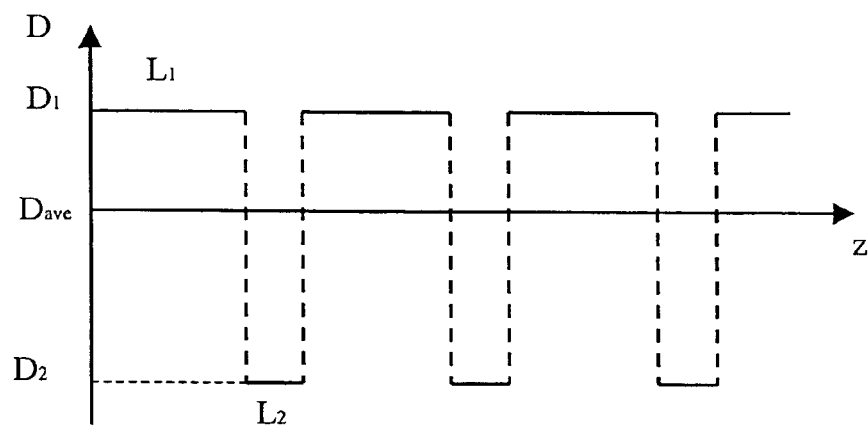
FIG. 3 shows schematically an optical path with alternating dispersion.

FIG. 3 shows schematically an optical link with alternating dispersion comprising two types of optical fibre, one with positive dispersion $D_1$ and the other with negative dispersion $D_2$, having lengths $L_1$ and $L_2$ respectively, combined in a suitable way according to a given dispersion map. Typically, the dispersion map is designed in such a way that the average dispersion $D_{ave}$ is zero for a given wavelength included in the transmission band. In the diagram shown in FIG. 3, the optical fibre with negative dispersion $D_2$ is a dispersion compensation fibre (DCF), and in the dispersion map $L_1 > L_2$. Alternatively, the compensation section can comprise dispersion compensators other than DCF fibres, for example those based on fibre gratings. The optical fibre having positive dispersion $D_1$ can be, for example, a standard single-mode optical fibre, having a dispersion in the range from approximately 16 ps/nm·km to 20 ps/nm·km at a wavelength of 1550 nm. Alternatively, the optical fibre having positive dispersion can be of the NZD (non-zero-dispersion) type, with a dispersion in the range from approximately 1 ps/nm·km to 4 ps/nm·km at a wavelength of 1550 nm, or an optical fibre of the HDS (half dispersion shifted) type, having a dispersion intermediate between those of an NZD fibre and a standard fibre. Other dispersion maps can provide long segments of optical fibre with negative dispersion, compensated by shorter segments of optical fibre with positive dispersion, for example as described in patent application WO 00/38356 in the name of the present applicant. The use of this type of dispersion map is advantageous especially for underwater systems. In some configurations, the dispersion maps can also comprise more than two types of optical fibres connected together, for example three types of optical fibres having different dispersion characteristics, two of which have a dispersion of opposite sign to each other.

The second optical path 5, located between the conversion device 6 and the receiving station 3, can comprise at least a third section and a fourth section of optical path which are optically interconnected. The third section of optical path comprises at least a third single-mode optical fibre. The fourth section of optical path can comprise at least a fourth single-mode optical fibre and has an average dispersion of opposite sign to the average dispersion of the third section in the transmission band. The two sections of optical path are disposed according to a given chromatic dispersion map.

Typically, in a wavelength band around 1550 nm, the second optical path 5 has an average chromatic dispersion $D''_{ave}$ which is monotonically dependent on the wavelength, with a given slope. Preferably, the dependence of the average dispersion on the wavelength $D''_{ave}(\lambda)$ of the second optical path 5 is essentially equal to the dependence of the average dispersion on the wavelength $D'_{ave}(\lambda)$ of the first optical path 4, at least in the transmission band. This can be achieved by initially forming the optical path OL between the transmission station 2 and the receiving station 3 by optical fibres with alternating dispersion according to a given map, and then interrupting this optical path OL with the conversion device 6 in the two separate optical paths 4 and 5. This method can be typically and advantageously used in already installed systems comprising optical fibres with alternating dispersion.

The two optical paths 4 and 5 can also comprise other devices, such as line amplifiers capable of compensating the attenuation losses introduced by the optical paths 4, 5. Preferably, these amplifiers are optical amplifiers, more preferably they are optical fibre amplifiers, and even more preferably they are erbium-doped optical fibre amplifiers. Alternatively, or in combination with the erbium-doped optical fibre amplifiers, the two optical paths 4, 5 can comprise other types of optical amplifiers, such as for example Raman amplifiers.

Figure 4:
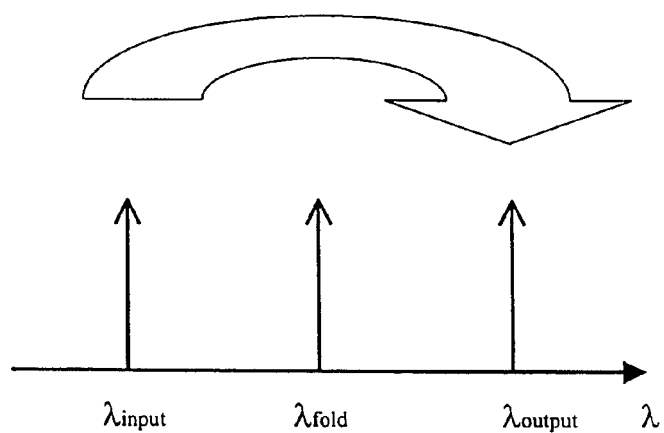
FIG. 4 shows schematically a wavelength conversion carried out by a spectral inversion device.

The conversion device 6 is a device capable of inverting the spectrum of the channels transmitted along the line and of modifying their central wavelength. As described above, one device capable of carrying out these functions is a phase conjugation device (OPC). Preferably, the OPC device is a polarization-independent device. Preferably, it comprises a non-linear means through which the optical channels and at least one linearly polarized pumping radiation pass twice, in one direction on the first pass and in the opposite direction on the second pass. On the second pass, the optical channels pass through the non-linear means after undergoing a rotation of $\pi/2$ of their polarization state. The polarization state of the pumping radiation remains unchanged throughout the double pass. An example of a device of this type is described in the article by C. R. Giles, V. Mizrahi and T. Erdogan, "Polarization-Independent Phase Conjugation in a Reflective Optical Mixer", IEEE *Photonics Technology Letters*, Vol. 7, No. 1, pp. 126–8 (1995). In general, as shown schematically in FIG. 4, an OPC device modifies the wavelength of an input signal $\lambda_{input}$ in such a way that the output signal has a wavelength $\lambda_{output}$ which is folded with respect to a "folding" wavelength $\lambda_{fold}$. The device operates in the same way if there is more than one input signal. As is known, the folding wavelength $\lambda_{fold}$ can be essentially equal to the pumping wavelength for some phase conjugation devices (for lithium niobate devices or FWM-based devices, for example), or can be a wavelength corresponding to a "virtual" electromagnetic radiation having a frequency $\omega_{fold}$ related to the frequency of the pumping radiation $\omega_{pump}$ in other phase conjugation devices. Typically, in this latter case, the frequency $\omega_{fold}$ can be a subharmonic with respect to the frequency of the pumping radiation $\omega_{pump}$ ($\omega_{pump}=2\omega_{fold}$).

Typically, the conversion device 6 can comprise one or more devices for filtering the residual wavelengths of the non-linear wavelength conversion process. Additionally, the conversion device can comprise one or more devices for amplification of the wavelength modified channels. Preferably, the conversion device 6 is located, in the WDM system 1, in a position corresponding to a length greater than or equal to L/2, where L is the length of the optical link OL.

Preferably, the conversion device 6 is located in the vicinity of a line amplifier (if present), in such a way that use can be made of an interruption which is already present in the optical line. The use of a pre-compensation device upstream of the conversion device 6 can also be provided, in order to introduce an equal predetermined quantity of additional dispersion (positive or negative) into all the optical channels before conversion. In addition or as an alternative to this pre-compensation device, a post-compensation device downstream of the conversion device 6 can also be provided, in order to introduce an equal predetermined quantity of additional dispersion (positive or negative) into all the optical channels after conversion. These pre- and/or post-compensation devices can be pieces of optical fibre with low non-linearity, for example standard single-mode optical fibre.

The use of a plurality of conversion devices located along the optical link OL can also be provided.

Because of the dependence of the average dispersion on the wavelength, or because of the non-zero slope of the average dispersion of the optical link OL, the different channels undergo different dispersions during the propagation along the optical link OL. For example, in the case of an alternating dispersion map as shown in FIG. 3, this is manifested in the fact that the different channels have different levels of accumulated chromatic dispersion at the end of each section of optical link consisting of a pair of optical fibres with dispersions $D_1$ and $D_2$.

The wavelength at which the mean dispersion $D'_{ave}$ of the first optical path 4 is cancelled will be denoted by $\lambda'_{100\%}$. This notation indicates a perfect compensation of the dispersion accumulated by the channel at the wavelength $\lambda'_{100\%}$ in the first optical fibre with dispersion $D_1$ by means of the second optical fibre $D_2$ (in the case of a map with only two types of optical fibre). Using a similar notation, $\lambda''_{100\%}$ denotes the wavelength at which the average dispersion $D''_{ave}$ of the second optical path 5 is cancelled. If the dispersion maps formed in the first optical path 4 and in the second optical path 5 are essentially equal, then clearly $\lambda'_{100\%} \approx \lambda''_{100\%}$. The other channels transmitted (in the first or in the second optical path) can be "under-compensated" (in other words with a level of compensation of less than 100%), if the fibre with dispersion $D_2$ does not succeed in cancelling all the dispersion introduced by the fibre with dispersion $D_1$, or can be "over-compensated" (in other words with a level of compensation in excess of 100%) if the fibre with dispersion $D_2$ introduces a dispersion greater than that introduced by the dispersion $D_1$. The under-compensated channels will be indicated by a symbol of the type $\lambda_{x\%}$, with x<100 (for example, $\lambda_{90\%}$, $\lambda_{95\%}$, $\lambda_{98\%}$). The over-compensated channels will be indicated by a symbol of the type $\lambda_{y\%}$, with y>100 (for example, $\lambda_{102}\%$, $\lambda_{105\%}$, $\lambda_{110\%}$).

Preferably, the wavelengths corresponding to under-compensated channels are selected in such a way that the channels have, in the first optical path 4 upstream of the conversion device 6, a level of under-compensation greater than or equal to 60%, which means (in the case of a map with only two types of optical fibre) that the dispersion accumulated in the first optical fibre with dispersion $D_1$ is compensated to a degree of at least 60% by the second optical fibre with dispersion $D_2$. Even more preferably, the wavelengths corresponding to under-compensated channels are selected in such a way that the channels have, in the first optical path 4 upstream of the conversion device 6, a level of under-compensation greater than or equal to 75%. Preferably, the wavelengths corresponding to over-compensated channels are selected in such a way that the channels have, in the first optical path 4 upstream of the conversion device 6, a level of over-compensation lower than or equal to 140%, which means (in the case of a map with only two types of optical fibre) that the dispersion accumulated in the first optical fibre with dispersion $D_1$ is compensated in excess up to a maximum of 140% by the second optical fibre with dispersion $D_2$. Even more preferably, the wavelengths corresponding to over-compensated channels are selected in such a way that the channels have, in the first optical path 4 upstream of the conversion device 6, a level of over-compensation lower than or equal to 125%.

A channel transmitted along the first optical path 4 having a wavelength $\lambda_{100\%}$ reaches the end of the first optical path 4 with an essentially zero level of accumulated dispersion.

A plurality of channels transmitted along the first optical path 4, having a wavelength $\lambda_x$ such that they are under-compensated, reaches the end of the first optical path 4 with a corresponding plurality of levels of accumulated dispersion, each essentially equal to $D'_{ave}(\lambda_x) \cdot L'$, where L' is the length of the first optical path 4. The sign of the dispersion accumulated by the under-compensated channels is the same for all the under-compensated channels.

A plurality of channels transmitted along the first optical path 4, having a wavelength $\lambda_y$ such that they are over-compensated, reaches the end of the first optical path 4 with a corresponding plurality of levels of accumulated dispersion, each essentially equal to $D'_{ave}(\lambda_y) \cdot L'$. The sign of the dispersion accumulated by the over-compensated channels is the same for all the over-compensated channels, and is opposite to the sign of the dispersion accumulated by under-compensated channels.

Figure 5:
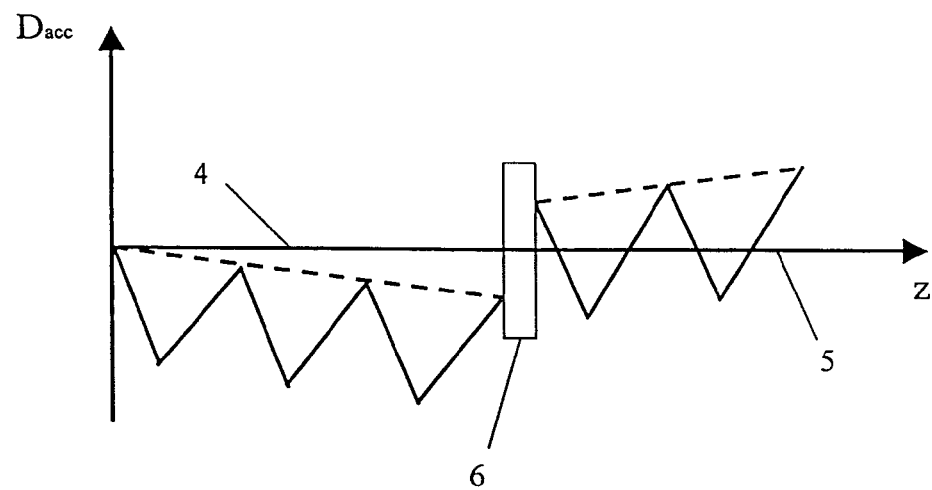
FIG. 5 shows schematically the incorrect use of a spectral inversion device, which results in failure to compensate the dispersion of a channel which accumulates negative dispersion along an optical path.

With reference to FIG. 5, we shall consider by way of example an under-compensated channel at wavelength $\lambda_1$ which accumulates negative dispersion along the first optical path 4, up to the conversion device 6. The progressive accumulation of negative dispersion due to the under-compensation is represented in FIG. 5 by the dashed straight line with a negative slope located upstream of the conversion device 6. The conversion device 6 inverts the spectrum of the under-compensated channel, converting the slowest spectral components into the fastest spectral components and vice versa. In practice, in the spectral inversion of the channel the conversion device 6 changes the sign of the dispersion accumulated by the channel (leaving its absolute value unchanged) from negative to positive. Additionally, the conversion device 6 modifies the central wavelength of the transmitted channel from $\lambda_1$ to $\lambda_{1c}$. As far as the wavelength conversion is concerned, it has to be ensured that the sign of the average dispersion $D'(\lambda_1)$ in the first optical path 4 is equal to the sign of the average dispersion $D'(\lambda_{1c})$ in the second optical path 5. In other words, the conversion device 6 must not convert an under-compensated channel in the first optical path into an over-compensated channel in the second optical path (or vice versa). This is because, if the conversion device 6 converted the under-compensated channel into an over-compensated converted channel in the course of the wavelength conversion, this channel would come to have a positive accumulated dispersion (as a result of the spectral inversion) at the start of the second optical path 5 and would continue to accumulate positive dispersion along the second optical path 5 (as a result of the modification of the wavelength). The progressive accumulation of positive dispersion due to the over-compensation of the converted channel is shown in FIG. 5 by the dashed straight line with a positive slope located downstream of the conversion device 6.

Figure 6A:
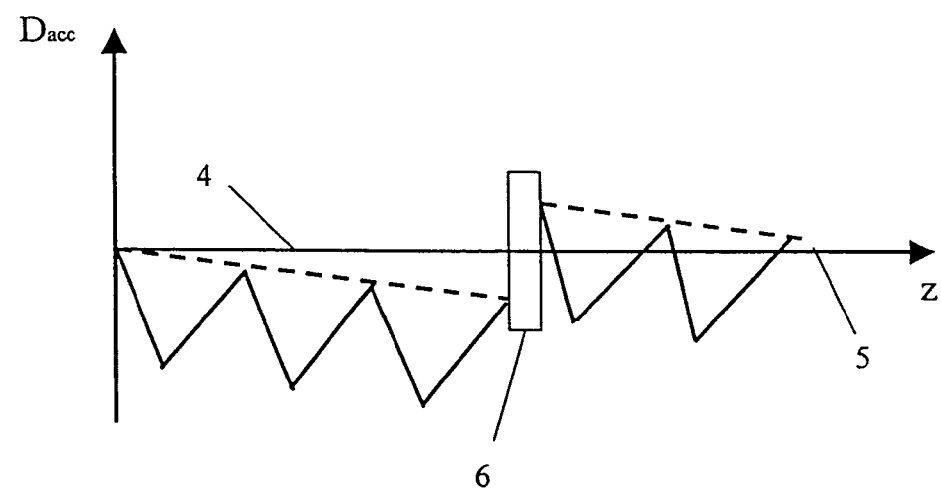
FIG. 6a shows schematically the correct use of a spectral inversion device, providing the compensation, along a second optical path, of the dispersion of a channel which accumulates negative dispersion along a first optical path.

With reference to FIG. 6a, we shall consider the same under-compensated channel which accumulates negative dispersion along the first optical path 4, up to the conversion device 6. As in the preceding case, the conversion device 6 inverts the spectrum of the under-compensated channel, converting the slowest spectral components in the fastest spectral components and vice versa, in other words changing the sign of the accumulated dispersion from negative to positive. Additionally, the conversion device 6 modifies the central wavelength of the transmitted channel. In the wavelength conversion, the conversion device 6 converts the under-compensated channel in the first optical path 4 into a converted channel, still under-compensated, in the second optical path 5. In such way the converted channel comes to have a positive accumulated dispersion (as a result of the spectral inversion) at the input of the second optical path 5: the second optical path 5, which continues to have a negative average dispersion for the converted channel, can thus compensate this dispersion. The wavelength conversion of the under-compensated channel to an under-compensated converted channel, with the consequent progressive compensation of the accumulated dispersion, are represented in FIG. 6a by the dashed straight line downstream of the conversion device 6, having a negative slope like the straight line upstream of the conversion device 6, which can intersect the zero value of accumulated dispersion at a point on the second optical path 5.

Clearly, the same considerations are valid when starting with an over-compensated channel. It should also be noted that the association of a negative accumulated dispersion with an under-compensated channel has been made purely by way of example and is not to be considered as limiting the invention.

Figure 6B:
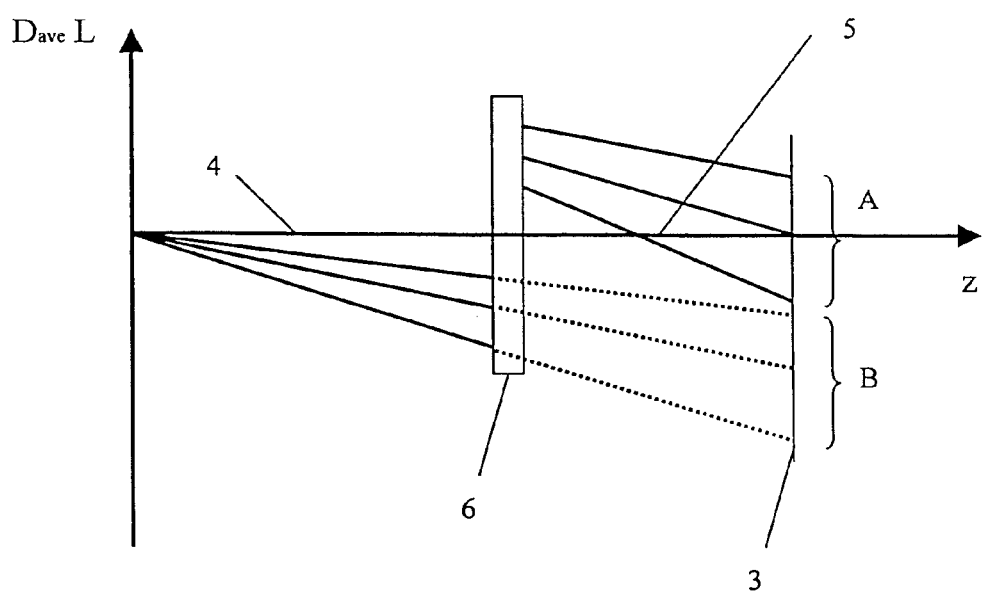
FIG. 6b shows schematically the use according to the invention of a spectral inversion device, which causes the dispersion accumulated by the three channels to be kept sufficiently low during the transmission along an optical path.

In the case of WDM transmission, the considerations relating to FIG. 6a can be repeated, by considering a plurality of channels at the input of the first optical path 4, all over-compensated or, alternatively, under-compensated (in the first optical path 4) at different levels, and converted to channels which are over-compensated or under-compensated respectively (in the second optical path 5) by the conversion device 6. FIG. 6b shows a diagram representing three under-compensated channels, which reach the conversion device 6 with different levels of negative accumulated dispersion due to the non-zero slope of the average dispersion of the first optical path from the wavelength, and are converted into under-compensated channels in such way as to compensate the dispersion in the second optical path 5 (continuous lines). For simplicity, the product of the average dispersion undergone by the different channels and the length is shown, instead of the variation of the dispersion accumulated by the different channels. The set of values of dispersion accumulated by the channels in the presence of the converter has been indicated by "A". As shown schematically in FIG. 6b, if the conversion device 6 were not present (dashed lines), the different channels would reach the receiving station 3 with higher levels (in absolute value) of accumulated dispersion: in FIG. 6b, the set of values of dispersion accumulated by the channels in the absence of a converter has been indicated by "B". The applicant has verified that at high transmission rates an excessively high accumulated dispersion can no longer be recovered by a post-compensation device located upstream of the receiver: in these cases, the quality of reception can be degraded to unacceptable levels for many of the transmitted channels. The applicant believes that this phenomenon is attributable to non-linear effects (such as XPM and/or SPM) which introduce distortions into the pulses transmitted at high bit rates, which have a brief duration and high peak power. According to the applicant, in the most dispersed pulses these distortions can no longer be corrected by linear post-compensation devices. This causes a marked decrease in the useful transmission band at high bit rates, in an optical system comprising fibres with alternating dispersion positioned according to a given dispersion map, with a dependence of the average dispersion on the wavelength having a non-zero slope.

The applicant has found that this problem can be solved by using the conversion device 6, which maintains the dispersion levels accumulated by the different channels at a sufficiently low level throughout the system, in such a way that the interaction between dispersion and non-linearity is markedly diminished. In a qualitative way, this phenomenon is represented schematically in FIG. 6b, in which it can be seen that the dispersion levels accumulated by the different channels in the optical system according to the invention (continuous lines) are kept closer (in absolute value) to the zero value of accumulated dispersion than in an optical system comprising only optical fibres with alternating dispersion (broken lines). In quantitative terms, this will be demonstrated more clearly in the following, with reference to the given examples.

From a practical point of view, the wavelength conversion of the different channels in the conversion device 6 can be carried out by a suitable specification of the wavelength of the folding radiation $\lambda_{fold}$ in relation to the wavelengths $\lambda'_{100\%}$ and $\lambda''_{100\%}$ for which the first optical path 4 and the second optical path 5 have a zero average dispersion.

Figure 7:
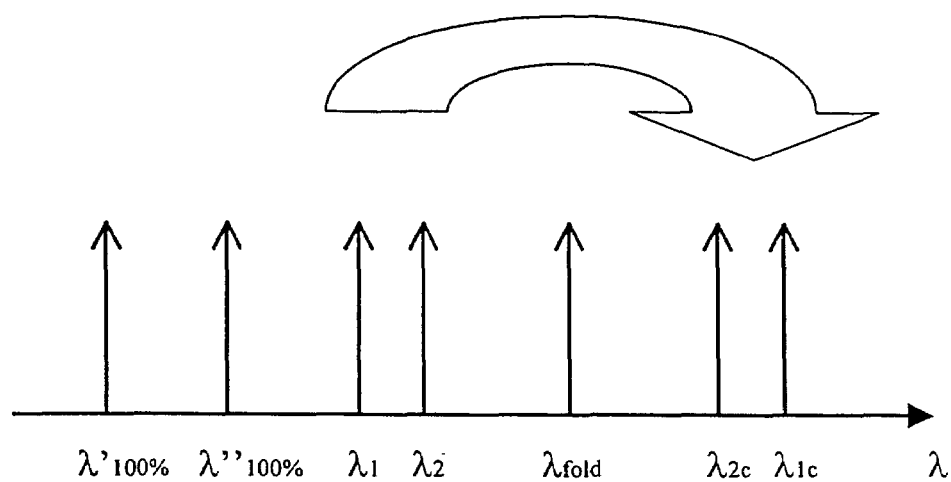
FIG. 7 shows a first way for selecting the folding radiation of a spectral inversion device.
Figure 8:
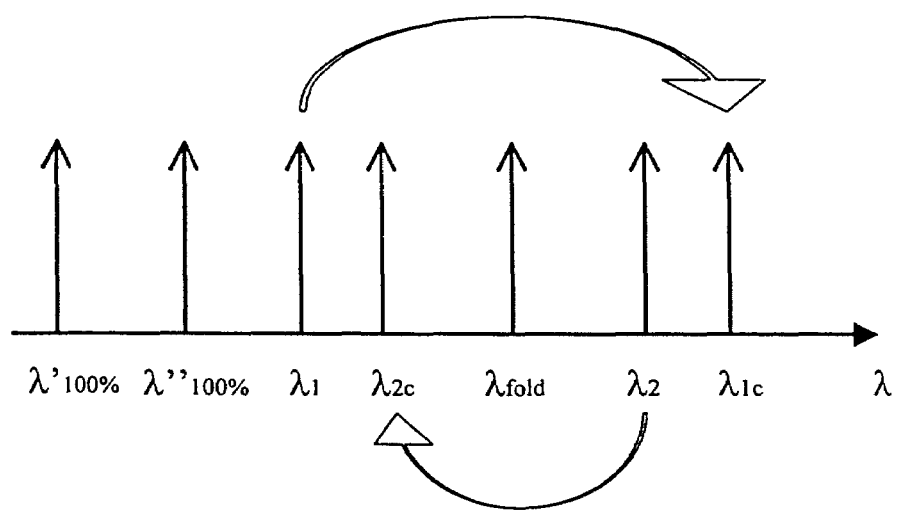
FIG. 8 shows a second way for selecting the folding radiation of a spectral inversion device.
Figure 7A:
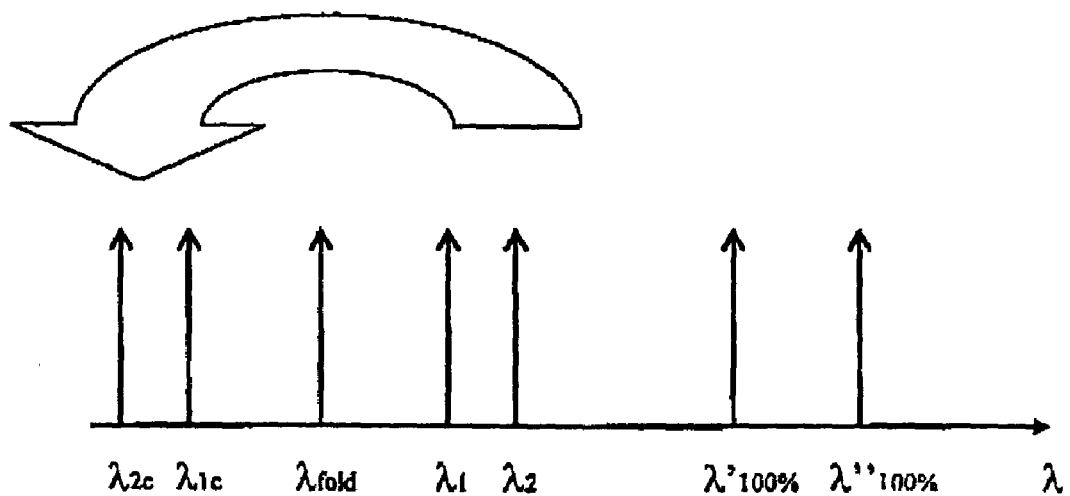
FIG. 7a shows a variation on the first way for selecting the folding radiation of a spectral inversion device.

FIGS. 7, 7a, and 8 show, by way of example, various possible schemes for the selection of the folding radiation $\lambda_{fold}$.

As illustrated by the scheme in FIG. 7, the wavelength of the folding radiation $\lambda_{fold}$ can be selected in such a way that, together with the greater of the wavelengths $\lambda'_{100\%}$ and $\lambda''_{100\%}$, it forms a range within which all the wavelengths of the channels to be compensated are included. In FIG. 7, $\lambda_{fold}$ is greater than the maximum wavelength of the channels transmitted in the first optical path. The channels with wavelengths $\lambda_1$ and $\lambda_2$, which may for example be over-compensated in the first optical path ($\lambda_{102\%}$ and $\lambda_{104\%}$), are converted to channels with wavelengths $\lambda_{1c}$ and $\lambda_{2c}$ which are still more over-compensated in the second optical path ($\lambda_{108\%}$ and $\lambda_{106\%}$ respectively). As can be seen, the wavelengths of the channels are folded around the folding wavelength $\lambda_{fold}$, in such a way that the channel which is less over-compensated is converted into the channel which is more over-compensated, and vice versa.

As shown in the alternative scheme in FIG. 8, the wavelength of the folding radiation $\lambda_{fold}$ can be selected in such a way that it lies between the wavelengths of the channels at the input of the conversion device 6. The conversion still keeps the channels over-compensated; in this case, the less over-compensated input channel ($\lambda_1$) is converted into the more over-compensated output channel ($\lambda_{1c}$), while the more over-compensated input channel ($\lambda_2$) is converted into a less over-compensated output channel ($\lambda_{2c}$).

In the schemes shown in FIGS. 7, 7a, and 8, the wavelengths of the channels remain on the same side of the wavelengths $\lambda'_{100\%}$ and $\lambda''_{100\%}$. The same considerations stated with reference to FIGS. 7 and 8 can be repeated for channels having wavelengths lower than the smallest of the wavelengths $\lambda'_{100\%}$ and $\lambda''_{100\%}$, as shown, for example, in FIG. 7a. In this case, the scheme of FIG. 7 would comprise a $\lambda_{fold}$ smaller than the minimum wavelength of the channels transmitted along the first optical path.

The technique described with reference to FIG. 8 is preferred, since it enables all, or at least a large part, of the bandwidth available in the first and second optical paths 4 and 5 to be fully exploited with a single conversion device and a single pumping radiation. This is because, assuming for example that channels are to be transmitted in the wavelength band between 1520 and 1570 nm (corresponding to a particularly low attenuation window of the optical fibres), the optical link OL can be designed in such a way that $\lambda'_{100\%}$ and $\lambda''_{100\%}$ lie outside the boundaries of the transmission band: by selecting a $\lambda_{fold}$ at approximately the centre of the band, channels of any wavelength can be transmitted within the band (these channels will all be over-compensated or, alternatively, under-compensated as a result of the selection of $\lambda'_{100\%}$ and $\lambda''_{100\%}$): the corresponding converted channels will still have their wavelengths included within the band and will all be under-compensated or, alternatively, over-compensated, since they will still be located on the same side of $\lambda'_{100\%}$ and $\lambda''_{100\%}$.

Figure 9:
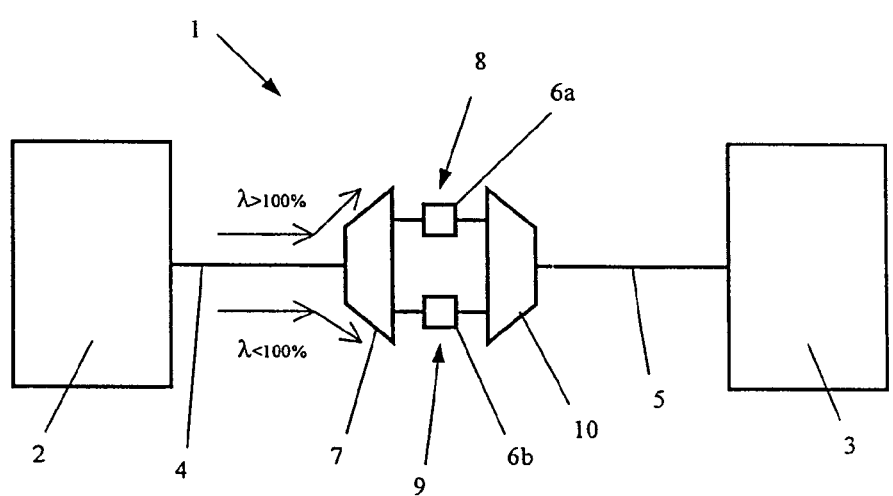
FIG. 9 shows schematically a second embodiment of a WDM system according to the invention.

On the other hand, with the method described with reference to FIG. 7, only part of the transmission band could be exploited, to prevent any of the converted channels from being finally located in a wavelength region outside the band. In this case, the WDM system can be configured so that it is still possible to exploit the whole available band. With reference to FIG. 9, from the transmission station 2 it is possible to send both channels having wavelengths corresponding to over-compensation ($\lambda_{>100\%}$) and channels having wavelengths corresponding to under-compensation ($\lambda_{<100\%}$) along the first optical path 4. At the end of the first optical path 4, the over-compensated channels can be separated from the under-compensated channels into two separate supplementary optical paths, namely a third (8) and a fourth (9) optical path respectively, by means of a suitable demultiplexing device 7. After the under-compensated channels have been separated from the over-compensated channels into the two optical paths 8 and 9, it is possible to use two conversion devices 6a and 6b, located in the third and the fourth optical path respectively, upstream of a multiplexing device 10. The two conversion devices 6a and 6b use folding radiations which have different wavelengths from each other and are such that the channels are kept over-compensated (with respect to the second optical path 5) in the optical path 8 and under-compensated (with respect to the second optical path 5) in the optical path 9. The channels converted in this way are then recombined into the second optical path 5 by the multiplexing device 10.

In a configuration which is not illustrated, the WDM system can comprise at least one other conversion device located in the optical link OL, at a certain distance (one or more spans of optical fibre, for example) from the first conversion device. A plurality of conversion devices placed "in series" along the optical link OL enables the accumulated dispersion to be kept at a sufficiently low level even for long systems.

In another configuration which is not illustrated, the WDM system can comprise at least one additional optical path connected to the output of the conversion device. This additional optical path can have its second end connected to an additional receiving station. Some of the channels with modified wavelength can thus be sent along the second optical path, as described above, while some of the other optical channels with modified wavelengths can be sent along the additional optical path. In this case, the wavelength conversion has to be carried out in such a way that the sign of the average dispersion of the channels with modified wavelengths does not change, both in the second optical path and in the additional optical path.

In the following part of the description the results of a series of simulations conducted by the applicant will be illustrated. In these examples, the optical link OL consisted of a series of five spans, each consisting of pairs of optical fibres with alternating dispersion: the first optical fibre was a fibre of the NZD (non-zero dispersion) type, having a dispersion of +4 ps/nm·km at 1550 nm, a dispersion slope at 1550 nm of +0.08 ps/nm$^2$·km, a non-linearity coefficient at 1550 nm of 1.45 (W·km)$^{-1}$, and an attenuation coefficient at 1550 nm of 0.25 dB/km; the second optical fibre was a fibre of the DCF type, having a dispersion of −80 ps/nm·km at 1550 nm, a dispersion slope at 1550 nm of −0.15 ps/nm$^2$·km, a non-linearity coefficient at 1550 nm of 5 (W·km)$^{-1}$, and an attenuation coefficient at 1550 nm of 0.3 dB/km. Each span consisted of 100 km of NZD fibre compensated by 5 km of DCF fibre. The average dispersion of the system was cancelled for a wavelength $\lambda_{100\%}$ of 1550 nm. Wavelengths above 1550 nm corresponded to under-compensated channels. Wavelengths below 1550 nm corresponded to over-compensated channels. The behaviour of RZ (32-bit pseudorandom) pulses modulated at 40 Gbit/s was simulated.

EXAMPLE 1

Figure 10:
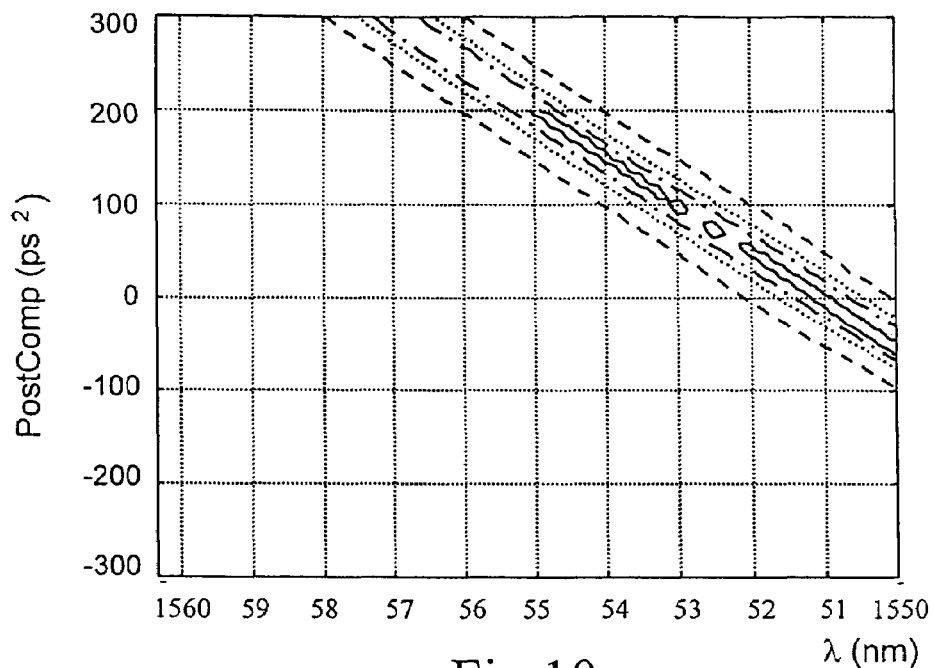
FIG. 10 shows the result of a simulation carried out for a WDM system according to the prior art.

The launch of under-compensated channels in a wavelength range from 1550 nm to 1561.2 nm, in a system with the characteristics described above, was simulated. The power per channel was 8 dBm. The pulses had a time interval of 25 ps and a width of 3 ps. Before input into the spans of optical fibres with alternating dispersion, a pre-compensation of +50 ps$^2$ was added to all the channels. The simulation was conducted without the spectrum and wavelength conversion device. The performance of the system was evaluated by determining the quantity of post-compensation to be applied, for all the channels, at the ends of the five spans of fibre. In particular, what is known as the "eye-opening", in other words the difference between the least powerful "1" bit and the most powerful "0" bit, was measured, for each transmitted channel and with different values of post-compensation, at the transmission station and at the receiving station. The difference between the transmitted eye-opening and the received eye-opening (penalty) was then calculated for each channel/post-compensation pair. According to the applicant, an acceptable penalty level for 40 Gbit/s systems is approximately 0.5 dB. FIG. 10 shows the result of the simulation, by a graph showing the post-compensation for each channel. The different level curves of FIG. 10 represent different levels of maximum penalty. In particular, the innermost level curve (the curve in continuous lines) delimits a maximum penalty value of 0.5 dB, while the outer level curves show, in progressive order towards the outside, maximum penalty values of 1 dB (dash-dotted curves), 2 dB (dotted curves) and 3 dB (dashed curves). As can be seen, it is possible to obtain a penalty of less than or equal to 0.5 dB only for channels within a working band between approximately 1550 nm and 1555 nm. In other words, for a typical spacing of 200 GHz (1.6 nm) between the channels (at 40 Gbit/s), a maximum of four channels having wavelengths of more than 1550 nm can be compensated, at the same time maintaining a penalty level less than or equal to 0.5 dB. This is due to the fact that the different channels have different levels of average dispersion in the optical path, because of the non-zero slope of the average dispersion: thus the channels more far from 1550 nm accumulate more dispersion. According to the applicant, non-linear effects introduce distortions into the most dispersive pulses during propagation, and these distortions can no longer be corrected by the linear post-compensation devices at an acceptable penalty level.

EXAMPLE 2

Figure 11:
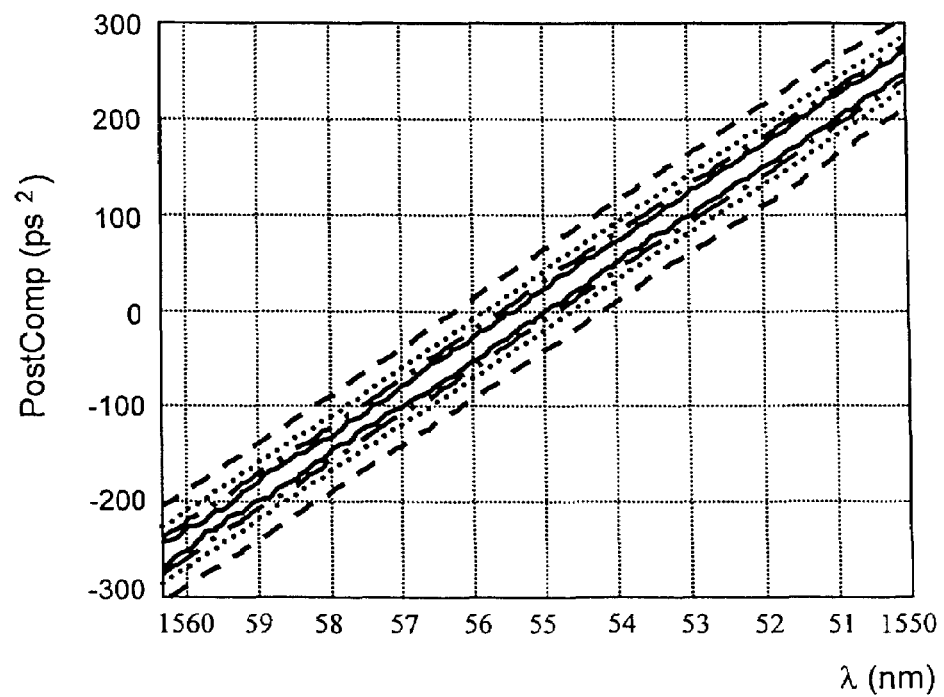
FIG. 11 shows the result of a simulation carried out for a WDM system according to the invention.

The simulation described with reference to Example 1 was repeated, with a spectrum and wavelength conversion device inserted after the fourth span of pairs of optical fibres. The folding radiation of the device had a wavelength of 1561.6 nm. Downstream of the conversion device, the channels had wavelengths in the range from 1562 nm to 1573.2 nm. FIG. 11 shows the result of the simulation. The wavelengths shown on the horizontal axis correspond to the wavelengths of the transmitted channels (upstream of the conversion). The level curves show, with the respective kind of line, the same maximum penalties as those shown in Example 1. It may be noted that the useful bandwidth for obtaining a penalty level less than or equal to 0.5 dB shown in FIG. 11 extends through the whole region from 1550 to 1561.2. As can be seen more clearly from FIG. 11, it can also extend into values above 1561.2. This corresponds to a wavelength band of more than 11 nm. This means that it is possible to compensate at least eight channels having wavelengths above 1550 nm, spaced apart by approximately 1.6 nm, while maintaining a penalty level less than or equal to 0.5 dB even for channels far from 1550 nm. The conversion device makes it possible to keep the dispersion accumulated by the less compensated channels sufficiently low during the transmission: thus, according to the applicant, the non-linearity does not distort the pulses excessively, and the correct form of the pulses can therefore be recovered in an acceptable way by linear post-compensation devices. From the result of the simulation, we can conclude that the pulses have a better propagation dynamics in the system comprising the conversion device. In practice, the negative effect due to the non-zero slope of the average dispersion of the system is compensated by the conversion device.

EXAMPLE 3

The simulations described with reference to Examples 1 and 2 were repeated, with the average power per channel raised to 10 dBm. In the case without a conversion device, the 0.5 dB maximum penalty band was found to be further confined to a wavelength region between 1550 and 1552 nm. In other words, for a typical channel spacing of 200 GHz (1.6 nm) (at 40 Gbit/s), a maximum of two channels with wavelengths above 1550 nm can be compensated while maintaining a penalty level less than or equal to 0.5 dB. With the conversion device, a 0.5 dB maximum penalty band of approximately 11 nm could still be obtained. In other words, for a typical channel spacing of 200 GHz (1.6 nm) (at 40 Gbit/s), seven to eight channels having wavelengths above 1550 nm can be compensated while maintaining a penalty level less than or equal to 0.5 dB.

EXAMPLE 4

Figure 12A:
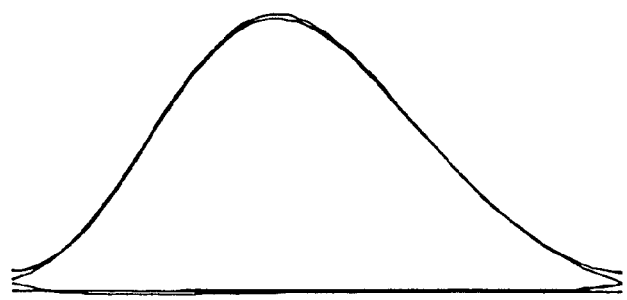
FIGS. 12a–b–c show the respective eye diagrams for a transmitted channel, for a channel received after propagation along an optical line comprising optical fibres with alternating dispersion, and for a channel received after propagation along an optical line comprising optical fibres with alternating dispersion and a spectral inversion device.
Figure 12B:
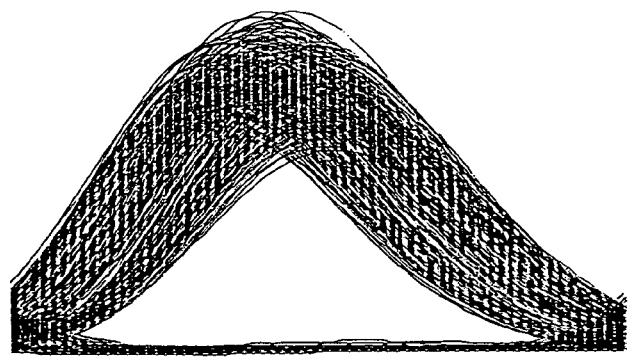
Figure 12C:
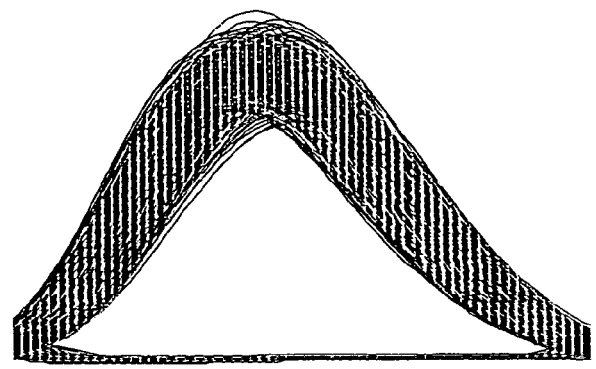

The simulations described in Example 3 were repeated with amplifiers introduced at the end of each positive NZD fibre—negative DCF fibre span. A gain of 25 dB per amplifier was assumed, compensating the attenuation introduced by propagation along the span of optical fibre located upstream of the amplifiers. The noise introduced by the amplifiers was considered by repeating the simulation 50 times with slightly different amplification conditions in each case, selected in a random way (50 run pseudorandom). For the simulations with the conversion device, it was assumed that the device introduced a signal loss of 25 dB: to compensate this loss, a further amplifier with a 25 dB gain was introduced in the simulations, and was placed after the conversion device. FIGS. 12*a–b–c* show the eye diagrams for the 1556 nm channel. In particular, FIG. 12*a* shows the eye diagram of the transmitted channel at the transmission station; FIG. 12*b* shows the eye diagram of the channel received after post-compensation in the case without a conversion device; FIG. 12*c* shows the eye diagram of the channel received after post-compensation in the presence of the conversion device. As can be seen, the improvement of the eye diagram is significant in the case in which the conversion device is present.

EXAMPLE 5

Figure 13:
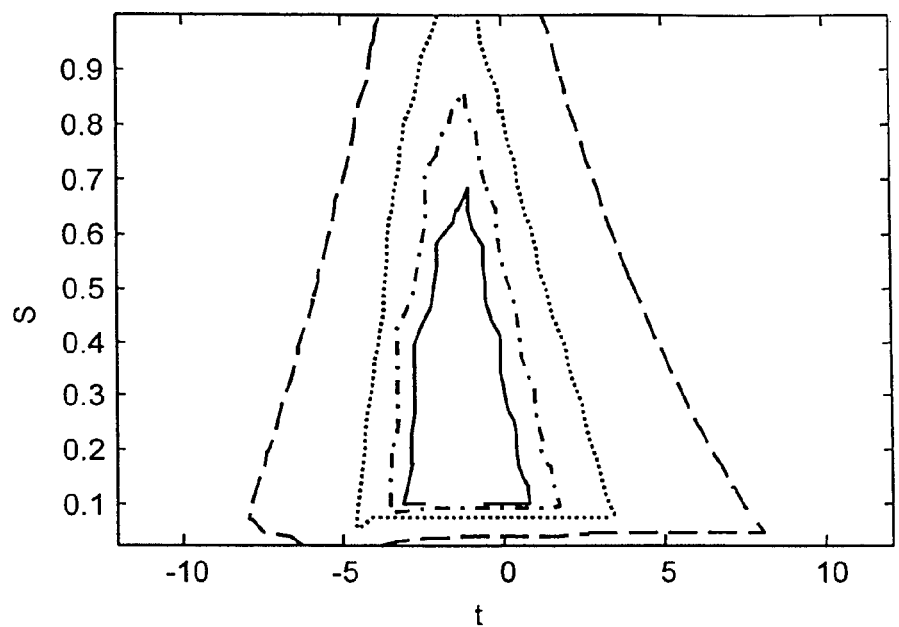
FIG. 13 shows the BER (bit error rate) level curves for the channel of FIG. 12b.
Figure 14:
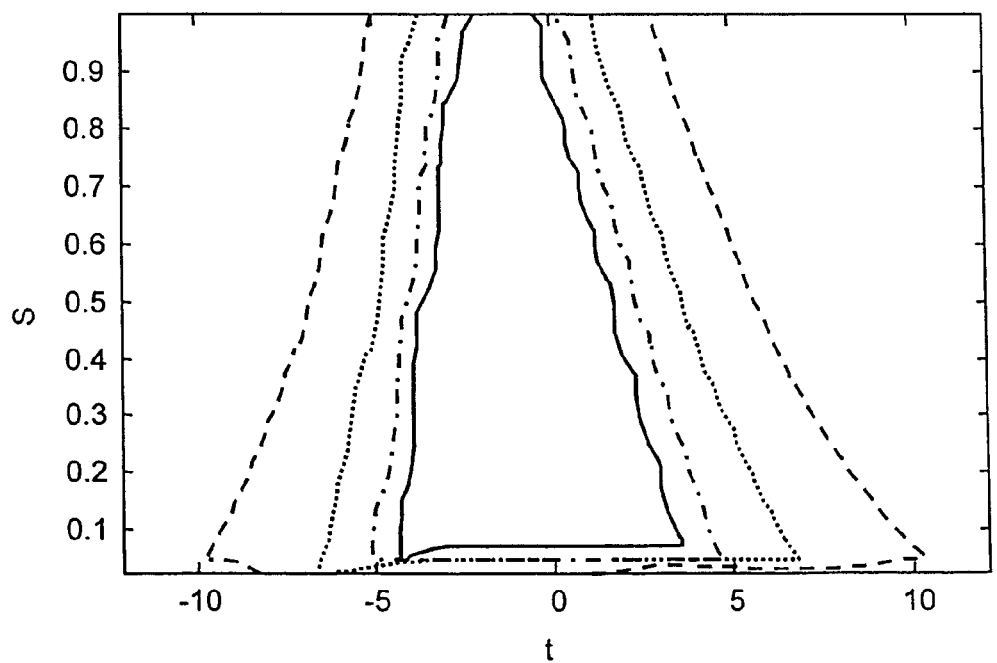
FIG. 14 shows the BER (bit error rate) level curves for the channel of FIG. 12c.

FIGS. 13 and 14 show the curves of BER (bit error rate) as a function of the sampling instant t at which the pulses can be detected at the receiver and of the threshold S which can be selected to distinguish a "0" bit from a "1" bit, without and with the conversion device respectively, these curves being obtained by means of the simulations described with reference to Example 3, for the 1556 nm channel. In both figures, the curves in continuous lines represent a maximum BER level of $10^{-12}$, the dash-dotted lines represent a maximum BER level of $10^{-9}$, the dotted lines represent a maximum BER level of $10^{-6}$, and the dashed lines represent a maximum BER level of $10^{-3}$. As a comparison of the two figures reveals, where the conversion device is present the BER curves which are obtained are much more open, with a higher tolerance in terms of the sampling instant and threshold.

EXAMPLE 6

The simulations described in Examples 1 and 2 were repeated, with a standard single-mode fibre introduced in place of the NZD fibre in the dispersion map. The standard fibre had a dispersion of +16 ps/nm·km at 1550 nm, a dispersion slope at 1550 nm of +0.066 ps/nm²·km, a non-linearity coefficient at 1550 nm of 1.266 (W·km)$^{-1}$, and an attenuation coefficient at 1550 nm of 0.25 dB/km. Pulses with a width of 10 ps and an average power per channel of 7 dBm were considered. Before input into the spans of optical fibre with alternating dispersion, a pre-compensation of +100 ps² was added to all the channels. It was found that, without a conversion device, a penalty of less than 0.5 dB could be obtained for channels lying within approximately 15 nm in a range of wavelengths between 1538.8 and 1561.2. With the conversion device, however, a penalty of less than 0.5 dB could be obtained for any channel lying within the range of wavelengths between 1538.8 nm and 1561.2 nm.

The invention claimed is:

1. A method of optical transmission in a WDM system comprising an optical link (OL), said optical link comprising at least a first and a second optical path, said first optical path comprising at least a first section and a second section, said method comprising the steps of:
    (a) transmitting along said first section of optical path a series of optical channels comprising at least a first plurality of optical channels experiencing, in said first optical path, a first plurality of average dispersion values having the same sign as each other;
    (b) compensating, at least partially, the dispersion accumulated by said first plurality of channels in said first section along said second section of optical path;
    (c) at the end of said first optical path, inverting spectrum and modifying wavelengths of said first plurality of optical channels in such a way as to obtain a second plurality of optical channels, experiencing, in said second optical path, a corresponding second plurality of values of average dispersion having the same sign as the values of average dispersion of said first plurality of average dispersion values,
        wherein said series of optical channels comprises at least a third plurality of optical channels experiencing, in said first optical path, a corresponding third plurality of values of average dispersion having the opposite sign to the values of average dispersion of said first plurality of average dispersion values;
    (d) transmitting the second plurality of optical channels along said second optical path;
    (e) separating the channels of said first plurality from the channels of said third plurality, in a third and a fourth optical path respectively, before said step of inverting the spectrum,
        wherein said third optical path comprises a first conversion device and the fourth optical path comprises a second conversion device;
    (f) inverting the spectrum and modifying the wavelengths of said third plurality of channels in said second conversion device in such a way as to produce a fourth plurality of channels, experiencing a corresponding fourth plurality of values of average dispersion which, in said second optical path, have the same sign as the values of average dispersion of said third plurality of values of average dispersion;
    (g) combining said second and said fourth plurality of channels in said second optical path; and
    (h) transmitting said fourth plurality of channels along said second optical path.

2. A method according to claim 1, wherein said step of compensating at least partially comprises compensating the dispersion accumulated by the channels of said first plurality at a level in the range from 60% to 100%.

3. A method according to claim 1, wherein said step of compensating at least partially comprises compensating in excess the dispersion accumulated by the channels of said first plurality at a level in the range from 100% to 140%.

4. A method according to claim 1, wherein said first section comprises a first optical fibre and said second section comprises a second optical fibre, said first and second optical fibres having chromatic dispersions of opposite sign in a transmission band comprising at least said first plurality of channels.

5. A method according to claim 1, wherein said steps of inverting the spectrum and modifying the wavelength of the channels of said first plurality can be carried out by means of at least a first phase conjugation device.

6. A method according to claim 5, wherein said step of modifying the wavelength comprises the folding of the wavelength value of each of the optical channels of said first plurality around the wavelength value of a folding radiation in the phase conjugation device.

7. A method according to claim 6, wherein the wavelength of said folding radiation is in the range from the minimum wavelength to the maximum wavelength of the channels of said first plurality.

8. A method according to claim 6, wherein the wavelength of said folding radiation is less than the minimum wavelength of the channels of said first plurality.

9. A method according to claim 6, wherein the wavelength of said folding radiation is greater than the maximum wavelength of the channels of said first plurality.

10. A method according to claim 1, wherein said second optical path comprises at least a third section and a fourth section, said step of transmitting at least said second plurality of channels further comprising the steps of:
  transmitting along said third section of optical path at least said second plurality of channels; and
  compensating at least partially the dispersion accumulated by said second plurality of channels in said third section along said fourth section of optical path.

11. A WDM system comprising:
  a transmission station capable of providing a series of optical channels;
  a receiving station;
  a first optical path connected at a first end to said transmission station, comprising a first section and a second section, said second section being capable of compensating at least partially a dispersion accumulated by said series of optical channels along said first section;
  said series of channels comprising at least a first plurality of channels experiencing a corresponding first plurality of values of average dispersion, having the same sign with each other, in said first optical path;
  a second optical path, connected at a first end to said receiving station;
  at least a first conversion device connected between said first and said second optical path, and capable of inverting the spectrum and modifying the wavelengths of at least said first plurality of channels, in such a way as to produce a second plurality of channels experiencing, in said second optical path, a corresponding plurality of values of average chromatic dispersion, having the same sign as the values of said first plurality of values of average dispersion,
    wherein said series of optical channels comprises at least a third plurality of channels, experiencing a corresponding third plurality of values of average chromatic dispersion having a sign opposite to that of the values of average dispersion experienced by said first plurality of channels in said first optical path;
  at least one demultiplexing device located upstream of said conversion device and capable of separating the channels of said first plurality from the channels of said third plurality, in a third and a fourth optical path respectively,
    wherein said third optical path comprises said first conversion device,
    wherein said fourth optical path comprises a second conversion device capable of inverting the spectrum and modifying the wavelengths of said third plurality of channels in such a way as to produce a fourth plurality of channels experiencing a corresponding fourth plurality of values of average chromatic dispersion, having, in said second optical path, the same sign as the values of said third plurality of values of average chromatic dispersion; and
  at least one multiplexing device connected to said third and said fourth optical paths downstream of said conversion devices, and capable of combining said second and said fourth pluralities of channels into said second optical path.

12. A system according to claim 11, wherein said first section comprises at least a first optical fibre and said second section comprises at least a second optical fibre having a dispersion of opposite sign to said first optical fibre in a wavelength band comprising at least said first plurality of channels.

13. A system according to claim 12, wherein said first and said second optical fibre have a dispersion, in absolute value, greater than or equal to 1 ps/(nm km) at 1550 nm.

14. A system according to claim 12, wherein said conversion device comprises a phase conjugation device.

15. A system according to claim 14, wherein said phase conjugation device is a polarization-independent device.

16. A system according to claim 14, wherein said phase conjugation device folds the wavelength value of each channel of said first plurality of channels about a folding wavelength.

17. A system according to claim 16, wherein said folding wavelength is comprised between the minimum wavelength and the maximum wavelength of the channels of said first plurality of channels.

18. A system according to claim 16, wherein said folding wavelength is lower than the minimum wavelength of the channels of said first plurality of channels.

19. A system according to claim 16, wherein said folding wavelength is greater than the maximum wavelength of the channels of said first plurality of channels.

20. A system according to claim 11, wherein said second optical path comprises a third section and a fourth section, said fourth section being capable of compensating at least partially a dispersion accumulated by said second plurality of optical channels along said third section.

21. A system according to claim 11, further comprising at least one line amplifier in said first or in said second optical path.

22. A system according to claim 21, wherein said conversion device is located close to a line amplifier.

23. A system according to claim 11, wherein said transmission station comprises a section for pre-compensation of the chromatic dispersion of said series of optical channels.

24. A system according to claim 11, wherein said receiving station comprises a section for post-compensation of the chromatic dispersion of said series of optical channels.

25. A system according to claim 11, wherein said series of optical channels is modulated at a bit rate greater than 10 Gbit/s.

* * * * *